(No Model.)
E. A. SMITH.
POTATO DIGGER.
No. 440,514.          Patented Nov. 11, 1890.
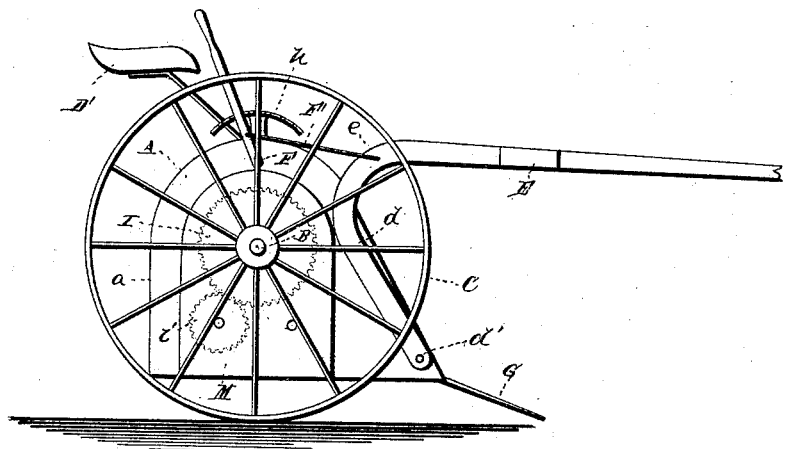
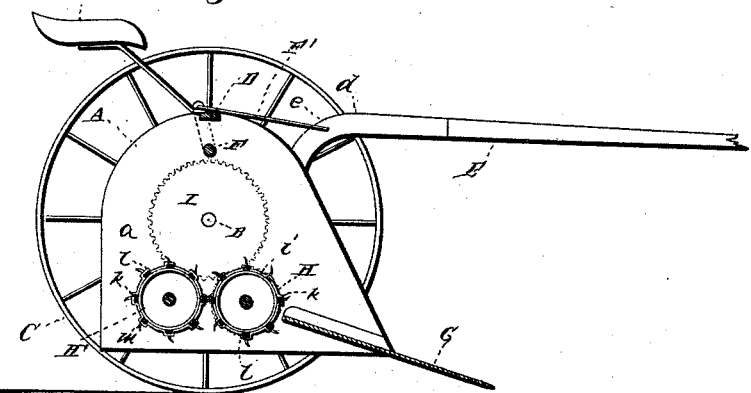
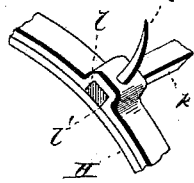
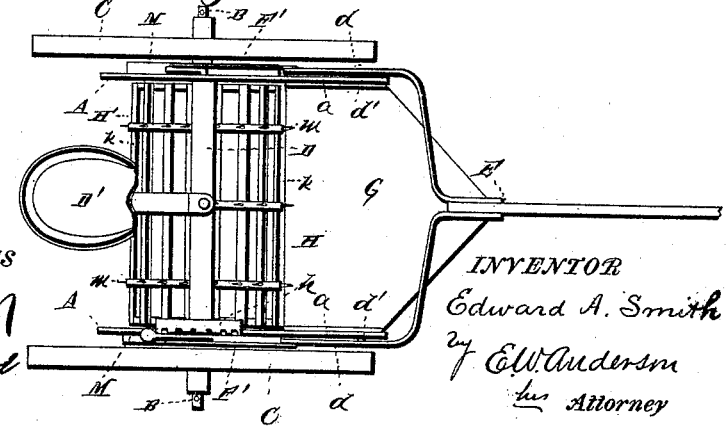
WITNESSES
INVENTOR
Edward A. Smith
by E. W. Anderson
his Attorney

UNITED STATES PATENT OFFICE.

EDWARD AL. SMITH, OF GREELEY, COLORADO.

POTATO-DIGGER.

SPECIFICATION forming part of Letters Patent No. 440,514, dated November 11, 1890.

Application filed June 4, 1890. Serial No. 354,216. (No model.)

*To all whom it may concern:*

Be it known that I, EDWARD AL. SMITH, a citizen of the United States, and a resident of Greeley, in the county of Weld and State of Colorado, have invented certain new and useful Improvements in Potato-Diggers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of my device in side elevation. Fig. 2 is a side view with one wheel removed. Fig. 3 is a plan view. Fig. 4 is a detail.

My invention relates to certain improvements in potato-diggers.

The object of the invention is to provide a device of this character which will be simple and effective; and the invention consists in the construction and combination of parts hereinafter described, and pointed out in the claims, reference being had to the accompanying drawings.

In the drawings, A represents the framework, which consists of the two upright side pieces $a\ a$, in which the short axles B B have their bearings, the wheels C C being rigidly mounted on said axles, and the side pieces $a\ a$ being connected at their upper ends by means of the cross-piece D, on which is mounted the seat D'. At the lower forward corners of the side pieces $a\ a$ are secured by pivots $d'$ the upwardly-extending arms $d$, which unite to form the tongue or draw-beam E, said arms at the points $e$ being connected by rods or links with the crank-arms of the lever-rod F.

G represents the inclined shovel, which is rigidly secured to the frame A between the sides $a\ a$ near their lower front ends, so that its adjustment depends upon a pivotal movement of the frame A upon the axles B B with reference to the draft. This shovel may be regulated for the required depth by means of the link-connections F', extending to the draft, and the transverse crank F, and is held in the desired adjustment by means of the lever-handle engaging the notches of the rack-bar $h$, secured to the cross-piece D.

H H' represent the riddles or cylinders for separating the dirt from the potatoes as they pass from the shovel, each cylinder being driven independently of the other, each of the main wheels driving one of the cylinders by means of the spur-gear and pinion I $i$. The cylinders H H' are formed of rods or slats $k$, which pass through a series of collars $l$, provided with the mortises or slots $l'$. By the use of these collars the cylinders are greatly strengthened, and much lighter rods or slats may be used. These collars are provided with the notches or spurs $m$ for the purpose of carrying the potatoes, weeds, vines, &c., over the cylinders more rapidly.

The gear and pinions at each side of the machine for driving the cylinders are inclosed in suitable boxes or casings M, in order to keep out dust and dirt.

Having thus fully described my invention, what I claim as new therein, and that for which I desire to secure Letters Patent, is—

1. The herein-described potato-digger, consisting of the sulky-frame A, pivoted on the short axles B, the carrying-wheels C, the inclined shovel G, secured to the sides of the frame, said shovel being adjustable by a pivotal movement of the frame with reference to the draft, separating-cylinders H H', driven independently of each other, respectively, by gearing on opposite sides of the frame, and regulating-lever mechanism, substantially as described.

2. In a potato-digger, the separating-cylinders formed of the slats or rods I, passing through the collars $k$, said collars being provided with the notches or spurs $m$, substantially as described.

In testimony whereof I affix my signature in presence of two witnesses.

EDWARD AL. SMITH.

Witnesses:
CYRUS W. MATTESON,
J. K. THOMPSON.